UNITED STATES PATENT OFFICE.

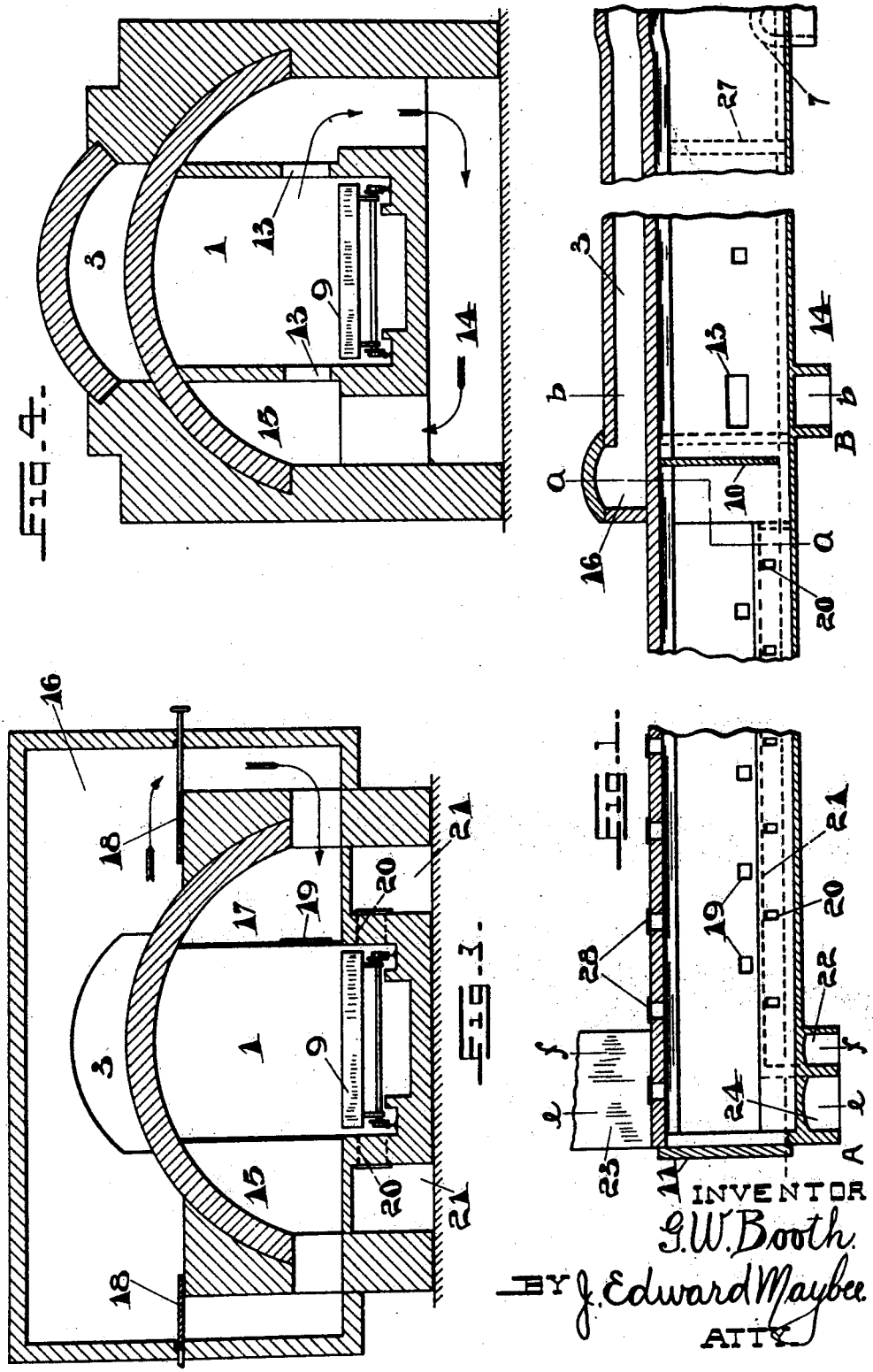

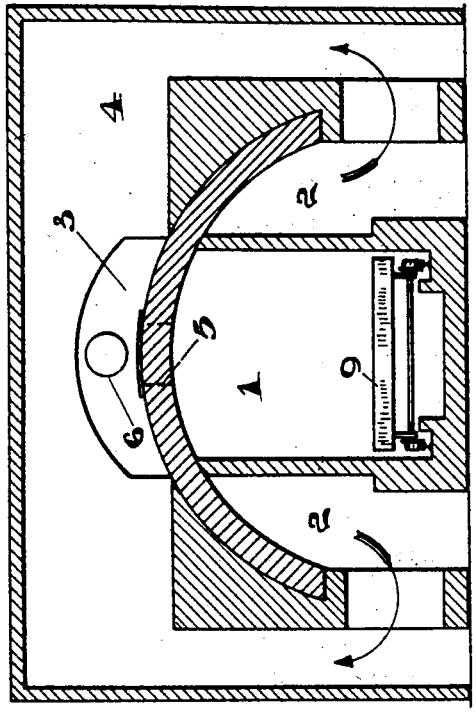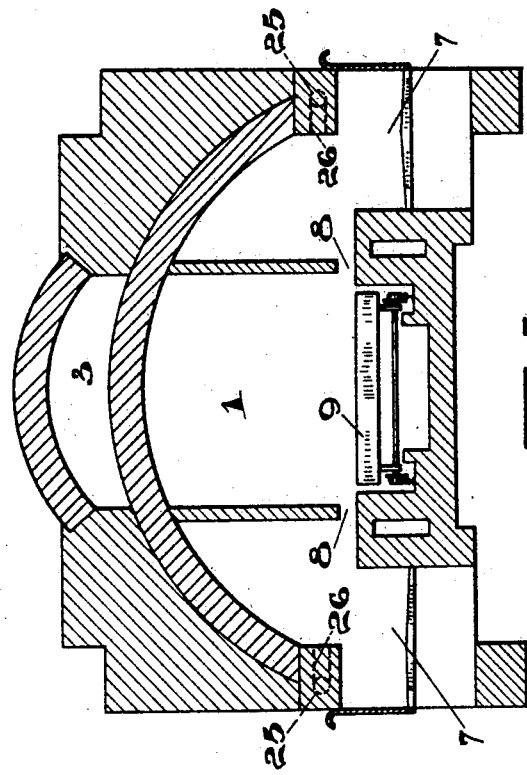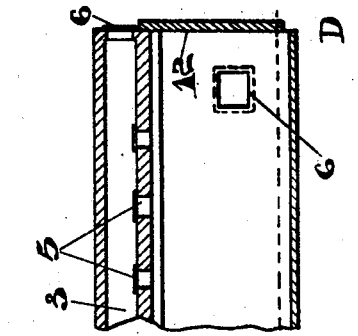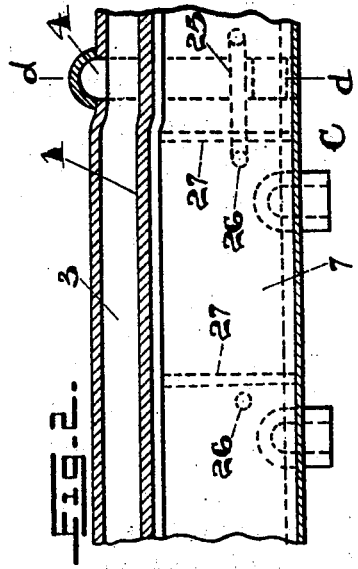

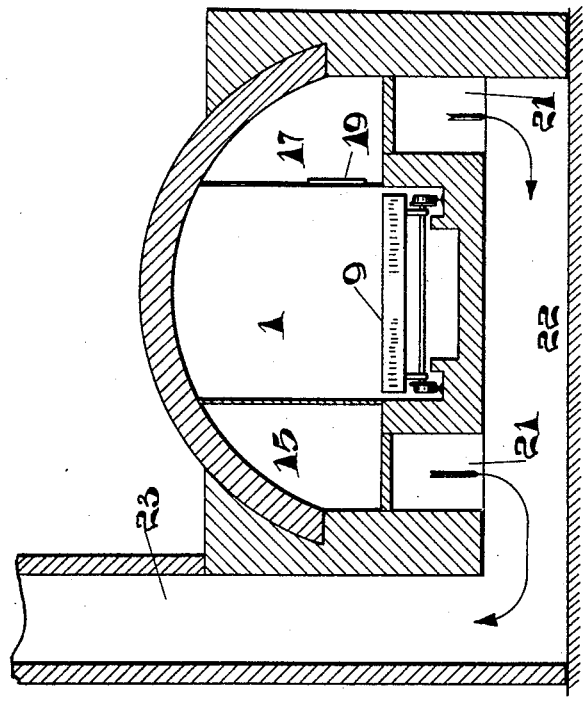
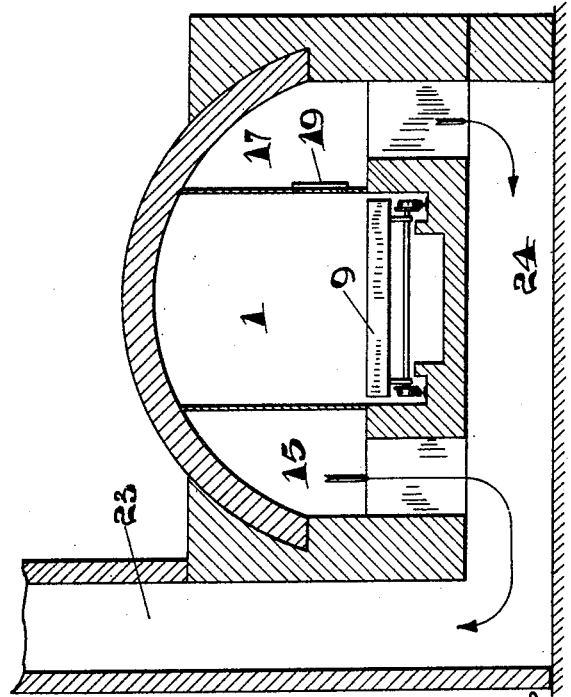

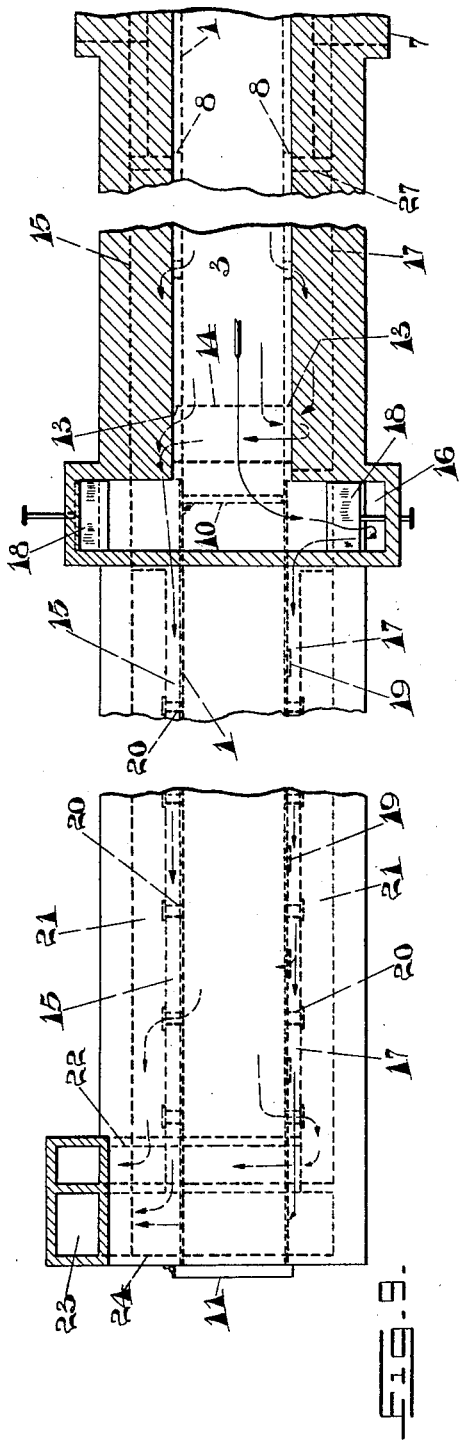
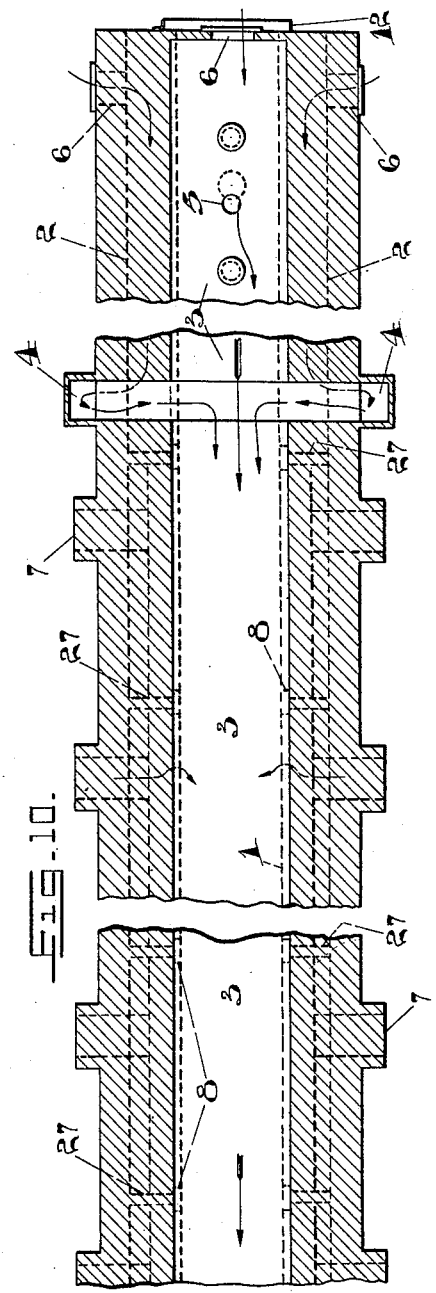

GEORGE W. BOOTH, OF ISLINGTON, ONTARIO, CANADA.

TUNNEL KILN.

1,403,734. Specification of Letters Patent. Patented Jan. 17, 1922.

Application filed September 3, 1920. Serial No. 407,942.

*To all whom it may concern:*

Be it known that I, GEORGE W. BOOTH, of Islington, in the county of York, Province of Ontario, Canada, a subject of the King of Great Britain, have invented certain new and useful Improvements in Tunnel Kilns, of which the following is a specification.

This invention relates to kilns of the type disclosed in my prior United States Patent No. 1333099 dated March 9th, 1920, and my object is to improve the construction of the kiln to reduce its cost, to secure better control of the preheating, firing and cooling of the goods than before, and to secure the desired results with the use of a minimum amount of fuel.

I attain my object by means of the constructions hereinafter described and illustrated in the accompanying drawings in which—

Fig. 1 is a longitudinal section elevation, partly broken away, of part of the kiln;

Fig. 2 a similar view of the remainder of the kiln;

Fig. 3 a cross section on the line $a$—$a$ in Fig. 1;

Fig. 4 a cross section on the line $b$—$b$ in Fig. 1;

Fig. 5 a cross section on the line $c$—$c$ in Fig. 2;

Fig. 6 a cross section on the line $d$—$d$ in Fig. 2;

Fig. 7 a section on the line $e$—$e$ in Fig. 1;

Fig. 8 a section on the line $f$—$f$ in Fig. 1;

Fig. 9 a horizontal longitudinal section of part of the kiln; and

Fig. 10 a similar view of the remainder of the kiln.

In the drawings like numerals of reference indicate corresponding parts in the different figures.

1 is the tunnel of the kiln, which extends from end to end thereof and comprises three zones, the preheating zone, which extends substantially from A to B, the firing zone from B to C and the cooling zone from C to D.

In the walls of the cooling zone of the tunnel are formed side air spaces 2 and the top air space 3. The air spaces 2 extend to the beginning of the firing zone of the kiln, while the air space 3 extends over the top of the firing zone of the kiln as far as the end of the said firing zone, so that the air passing therethrough takes up heat from the top of the tunnel of the cooling and firing zones. The transverse flues 4 connect the air spaces 2 with the top air space 3 where the cooling zone adjoins the firing zone, so that all the preheated air in the sides and top of the cooling zone is led through the top air space over the firing zone. Preferably openings 5 are provided in the top of the tunnel in the cooling zone communicating with the air space 3, so that heated air from the cooling goods may pass up into the air space 3.

Dampers 6 are preferably provided at the outlet end of the kiln through which outside air may be introduced into the air spaces 2 and 3.

Along the sides of the firing zone of the kiln are located one or more furnaces 7 of any ordinary type, which communicate with the interior of the tunnel through openings 8 located at about the level of the top of the trucks 9 on which the goods are transported through the kiln. With this arrangement the tendency to over burn the goods nearest the top of the kiln is avoided.

The products of combustion normally pass through the firing zone of the tunnel up to a point adjacent the preheating zone. At this point the tunnel will sometimes be provided with a door 10 by means of which the firing zone may be separated from the preheating zone. This door will usually be arranged in the ordinary manner to be opened and closed simultaneously with the opening of the door 11 at the inlet end of the tunnel. At this point the hot products of combustion pass out through the openings 13 into the transverse flue 14 which leads the products of combustion into the longitudinal side flue 15 extending along one side of the preheating zone of the kiln and preferably overlapping the firing zone. This overlapping portion is provided with a plurality of damper controlled openings 28 leading from the interior of the firing zone of the tunnel at different distances from the preheating zone. More or less of the products of combustion may thus be removed from the tunnel before the transverse flue 14 is reached.

Through a transverse flue 16 the heated air from the air space 3 is normally led to the longitudinal side flue 17 extending along the preheating zone of the kiln at the opposite side of the kiln to the flue 15. This transverse flue also communicates with the side flue 15 so that preheated air may be led to both the side flues 15 and 17. Dampers 18 are provided whereby the communications may be controlled. Normally the preheated air will flow along the side flue 17, but more or less may be admitted to the flue 15 as conditions may require. It will be noted that the inner walls of the flue 15 and 17 are preferably of metal so that heat is readily conducted through them to preheat the goods passing through this zone of the kiln.

The preheated air may be admitted, if desired, into the interior of the kiln at various points along the preheating zone through damper controlled openings 19. Moist air from the goods passing through the preheating zone is allowed to escape through a series of damper controlled openings 20 into two moist air flues 21 located below the flues 15 and 17. These moist air flues communicate at the inlet end of the kiln with the transverse flue 22 which communicates with the stack 23. The flues 15 and 17 communicate with the transverse flue 24, which also communicates with the stack 23, thus the moist air, the preheated air and the products of combustion are all taken off by the stack. At times it is desirable to admit cold air to the interior of the preheating zone of the furnace to reduce the temperature and I therefore provide the series of damper controlled openings 28 for this purpose.

At times it is advantageous to supply preheated air to the furnaces and suitable flues 25 are provided for this purpose communicating with the preheated air spaces and by damper controlled openings 26 with the furnaces. The furnaces at either side are separated from one another and from the flues 15 and 17 by transverse walls 27.

I find that a kiln constructed as hereinbefore described is not only cheaper to build than the form described in my previous patent but also affords better control of the heat in the firing zone, and of the preheating of the goods and the drawing away of the moist air therefrom.

What I claim as my invention is:—

1. A tunnel kiln having an air space formed in its walls extending longitudinally of the preheating, firing and cooling zones of the kiln; a furnace communicating with the interior of the firing zone of the tunnel adjacent the cooling zone; a stack adjacent the inlet end of the preheating zone; a flue communicating with the interior of the firing zone of the tunnel and extending along the preheating zone of the furnace to the stack; and a flue forming a communication between the stack and the air space aforesaid adjacent the inlet end of the tunnel.

2. A tunnel kiln constructed substantially as set forth in claim 1 provided with a moist air flue communicating with the stack extending longitudinally of the preheating zone of the tunnel and a plurality of passages from the preheating zone to the said flue at different points longitudinally of the preheating zone of the kiln.

3. A tunnel kiln constructed substantially as set forth in claim 1 provided with a damper controlled communication between the air space and the flue carrying the products of combustion from the firing zone of the tunnel, said communication being located substantially at the end of the firing zone adjacent the preheating zone.

4. A tunnel kiln constructed substantially as set forth in claim 1 provided with a moist air flue communicating with the stack extending longitudinally of the preheating zone of the tunnel and a plurality of passages from the preheating zone to the said flue at different points longitudinally of the preheating zone of the kiln, and a series of damper controlled openings between the air space and the interior of the tunnel at different points longitudinally of the preheating zone of the tunnel.

5. A tunnel kiln, including preheating, firing and cooling zones, having separated air spaces extending longitudinally of the walls of its cooling zone, an air space extending longitudinally through the top of both the cooling and firing zones; a transverse flue substantially at the junction of the firing and cooling zones connecting the side air spaces with the top air space; a flue at one side of the preheating zone communicatable with the interior of the tunnel at the adjacent end of the firing zone; a flue at the other side of the preheating zone communicatable with the top air space at the adjacent end of the firing zone; and a stack at the inlet end of the tunnel communicating with both flues.

6. A tunnel kiln, including preheating, firing and cooling zones, having an air space extending longitudinally of the cooling zone and along the top of the firing zone; a flue at one side of the preheating zone communicatable with the interior of the tunnel at the adjacent end of the firing zone; a flue at the other side of the preheating zone communicatable with the top air space at the adjacent end of the firing zone; and a stack at the inlet end of the tunnel communicating with both flues.

7. A tunnel kiln constructed as set forth in claim 6 provided with a moist air flue below each of the side flues, each communicatable with the stack and each communicating with the interior of the tunnel at a number of different points longitudinally of the preheating zone of the kiln.

8. A tunnel kiln constructed as set forth in claim 6 provided with a damper controlled communication between the top air space and the flue for the products of combustion.

9. A tunnel kiln constructed as set forth in claim 6 in which the side flue forming a communication between the firing zone of the tunnel and the stack overlaps the firing zone and communicates therewith by means of a plurality of damper controlled openings at different points longitudinally of the kiln.

10. A tunnel kiln constructed as set forth in claim 6 in which the firing zone is provided with a plurality of furnaces each having a damper controlled communication with the longitudinal air space whereby preheated air may be supplied to the furnaces as desired.

Signed at Toronto, Canada, this 28th day of August, 1920.

GEORGE W. BOOTH.